(No Model.) 3 Sheets—Sheet 1.

A. W. MENK.
CHAIN AND SPROCKET WHEEL FOR DRIVING BICYCLES, &c.

No. 599,970. Patented Mar. 1, 1898.

Witnesses:
Harry Kilgore
Frank D. Merchant

Inventor:
Anthony W. Menk.
By his Attorney,
Jas. F. Williamson (No Model.)
A. W. MENK.
CHAIN AND SPROCKET WHEEL FOR DRIVING BICYCLES, &c.
No. 599,970.        Patented Mar. 1, 1898.
3 Sheets—Sheet 2.
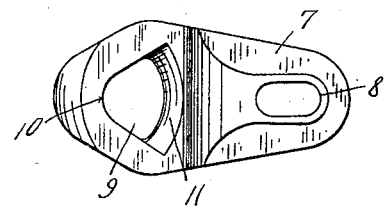
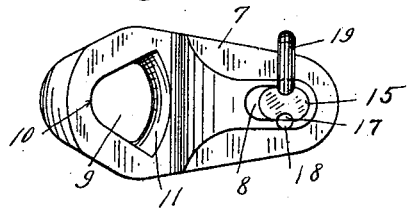
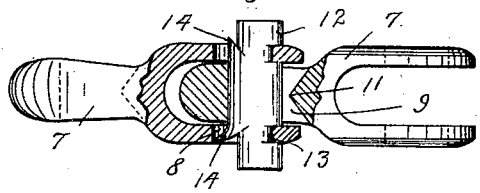
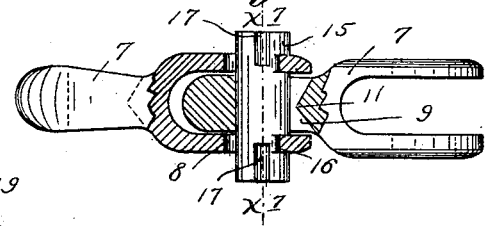
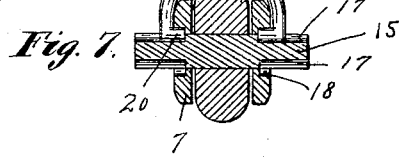
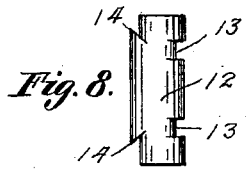
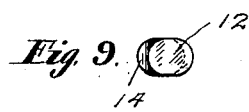
Witnesses.
Harry Kilgore
Frank D. Merchant
Inventor:
Anthony W. Menk.
By his Attorney.
Jas. F. Williamson (No Model.) 3 Sheets—Sheet 3.
A. W. MENK.
CHAIN AND SPROCKET WHEEL FOR DRIVING BICYCLES, &c.
No. 599,970. Patented Mar. 1, 1898.
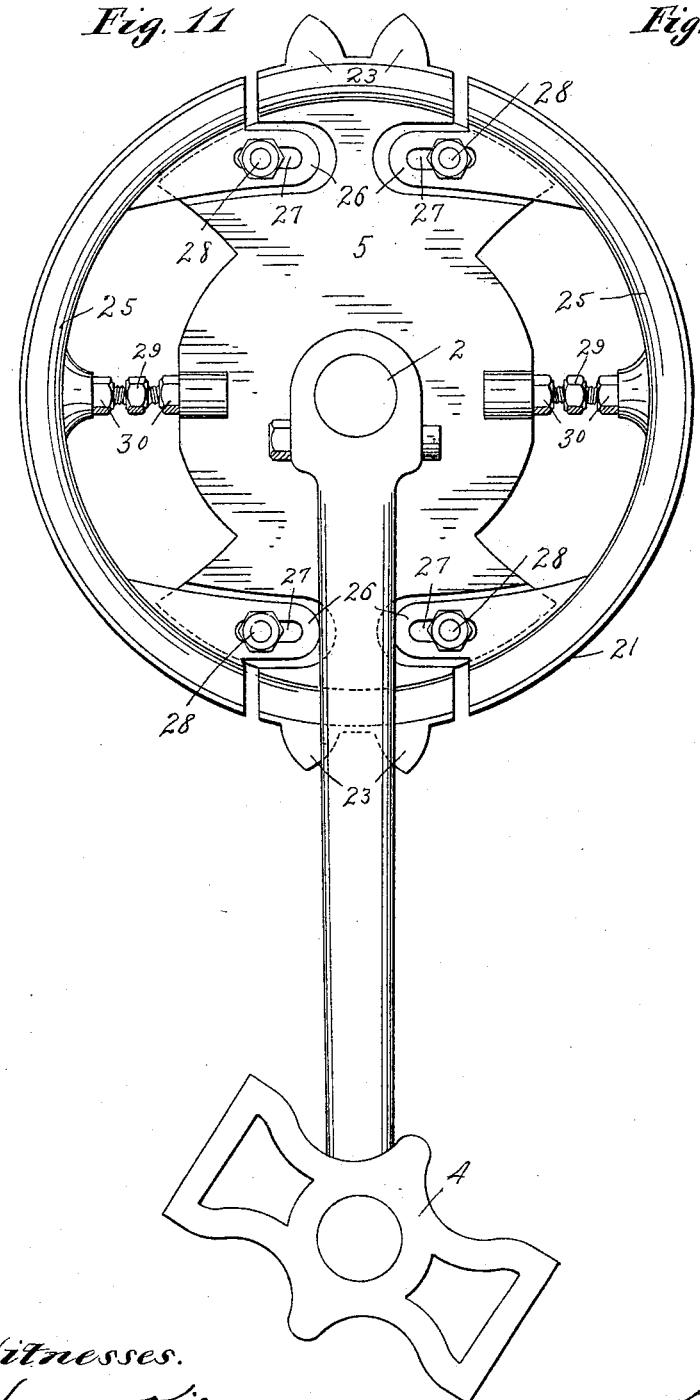
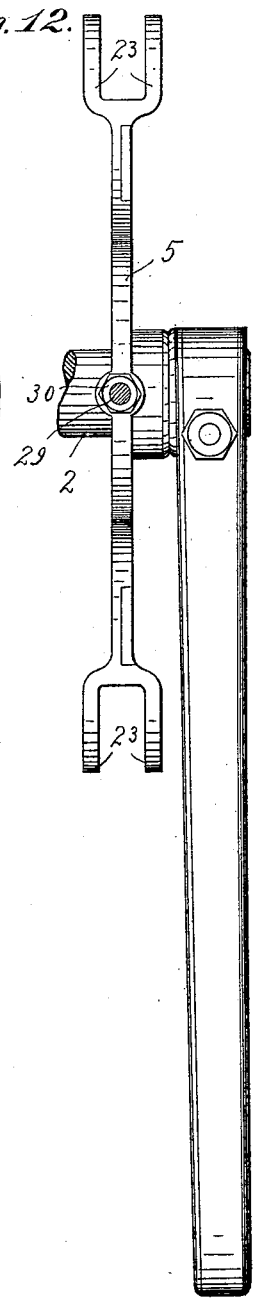
Witnesses.
Harry Kilgore
Frank D. Merchant
Inventor:
Anthony W. Menk.
By his Attorney,
Jas. F. Williamson

UNITED STATES PATENT OFFICE.

ANTHONY W. MENK, OF MINNEAPOLIS, MINNESOTA.

CHAIN AND SPROCKET-WHEEL FOR DRIVING BICYCLES, &c.

SPECIFICATION forming part of Letters Patent No. 599,970, dated March 1, 1898.

Application filed February 27, 1897. Serial No. 625,343. (No model.)

*To all whom it may concern:*

Be it known that I, ANTHONY W. MENK, of 2313 Fremont avenue, north, Minneapolis, in the county of Hennepin and State of Minnesota, have invented new and useful Improvements in Sprocket-and-Chain Drives for Bicycles, of which the following is a full, clear, and exact specification.

My invention has for its object to provide an improved sprocket-and-chain drive which will run with the minimum of friction, and hence transmit the maximum of power which is applied to the same, and which on account of its substantially frictionless action will run without the use of oil, thus effecting an economy in oil and leaving the chain in a clean condition.

My invention, while well adapted for general use for transmitting power wherever a sprocket-and-chain drive is serviceable, was especially designed and is especially adapted for use as a driving-gear for bicycles.

To the ends above noted my invention consists of the novel devices and combinations of devices hereinafter described, and defined in the claims.

The preferred form of my invention is illustrated in the accompanying drawings, wherein, like characters indicating like parts throughout the several views—

Figure 1:
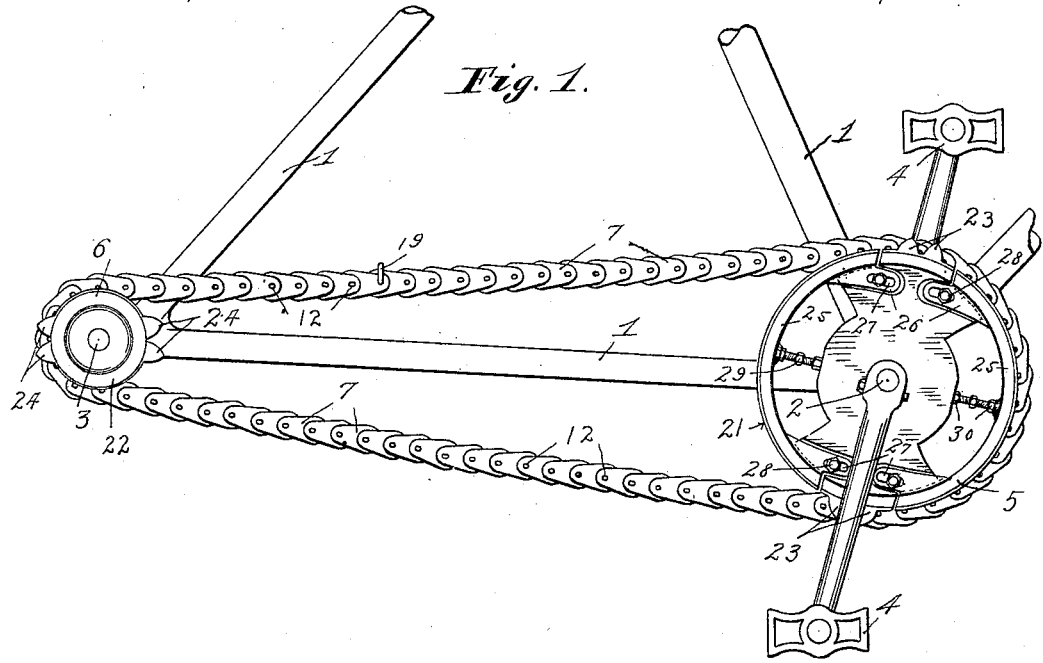
Figure 2:
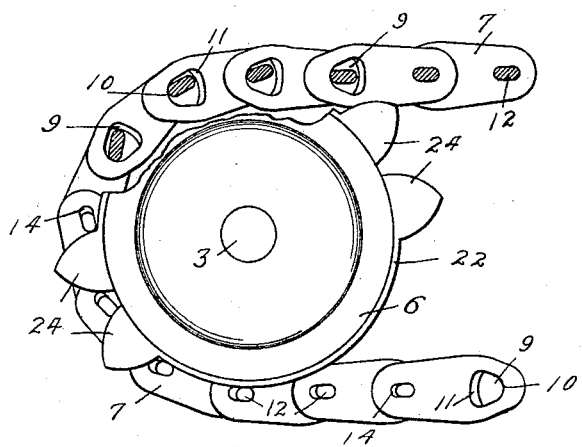

Figure 1 is a view in right side elevation, some parts being broken away, showing my improved sprocket-and-chain drive applied to an ordinary bicycle. Fig. 2 is an enlarged view, in side elevation, some parts being broken away, showing the rear or driven member of the sprocket-wheels and a portion of the driving-chain in working position on the same. Fig. 3 is an enlarged view, in side elevation, of one of the chain-links. Fig. 4 is a plan view, with some parts broken away, showing two connected links of the chain. Fig. 5 is a side elevation showing the separable pair of links which are located at the ends of the chain, said links being connected or coupled together. Fig. 6 is a plan view, with some parts broken away, of the chain links and coupling shown in Fig. 5. Fig. 7 is a transverse vertical section taken on the line $X^7 X^7$ of Fig. 6. Figs. 8 and 9 are views respectively in plan and end elevation, showing one of the link-pins removed. Fig. 10 is a plan view of the so-called "coupling-yoke" removed from the chain; and Figs. 11 and 12 are views respectively in side elevation and plan, showing, on an enlarged scale, the novel construction of the driving-sprocket of the bicycle.

1 indicates the braces of an ordinary bicycle-frame, in suitable bearings of which the pedal crank-shaft 2 and rear-wheel spindle 3 are mounted in the ordinary manner.

The pedal crank-shaft 2 is provided with the ordinary pedals 4 and with a driving-sprocket 5, of novel construction, the details of which will be described later on.

6 indicates a small driven sprocket which is loosely mounted on the spindle 3 and is secured to the hub of the rear wheel (not shown) of the bicycle.

The sprocket-chain is made up of fork-shaped links 7, connected together, with the prongs of each link receiving the stem of the adjacent link. The prongs of this link are provided with elongated seats 8, and the stem or single web portion of each link is provided with a transverse seat 9, which is substantially triangular in shape, but is formed with a rounded bearing-surface 10, which cuts off the apex of the angle. As shown, the base of the angular seat 9 is also slightly rounded and is beveled, as shown at 11, so as to prevent the accumulation of dirt or sand within said seat. The joints between all of the links, except one, are made by means of link-pins 12, which in cross-section are flattened or substantially oval and of such size as to fit the seats 8 in the link-prongs with freedom for considerable play or lateral movement in the direction of the major axis of said seats 8. The link-pins 12 are of such length that when passed through the seats 8 of one link and through the seat 9 of the connecting-link they will project a considerable distance on each side of the chain. They are provided with lock-notches 13, which, when the pin 12 is thus placed in working position and moved laterally, are adapted to straddle or embrace the web or pronged portions of the link adjacent to the seat 8 under the drawing action of the chain.

To prevent accidental displacement of the link-pin 12, I form the same with V-shaped shoulders 14, which are adapted to be upset or riveted down, so as to completely fill the seats 8 and firmly hold the link-pins 12 in working position. In Fig. 4 a link-pin is shown in working position, with one of the V-shaped shoulders in normal condition and the other upset or riveted into the seat 8.

The links which constitute the ends of the chain are separably connected by a removable link-pin 15, provided with lock-notches 16, which, with the exceptions hereinafter noted, is similar to the link-pins 12, with notches 13, heretofore described. With this removable pin 15, however, the shoulders 14 are dispensed with, and the pin is provided with semicircular grooves 17 at its opposite ends which register with the semicircular seats 18, formed in the seats 8 of one of the end links 7. Preferably both the pin 15 and the coöperating seats 8 are provided, respectively, with the semicircular seats 17 and 18 both on their under and upper sides, so as to adapt the chain to be reversed, as will hereinafter appear.

To lock the pin 15 in working position, I provide a U-shaped spring or coupling-yoke 19 with inturned detent ends 20, which is adapted to be placed in working position, as best shown in Fig. 7, with its detent ends 20 engaging the coöperating or registered seats 17 and 18. By this means the links at the ends of the chain are secured together, but may be readily disconnected by removing the coupling-yoke 19 and then withdrawing the pin 15 from working position.

The sprocket-wheels 5 and 6 are provided with parallel peripheral flanges 21 and 22, respectively. The parallel flanges 21 of the driving-sprocket 5 are formed at diametrically opposite points, substantially in line with the crank-arms of the crank-shaft 2, with several sprocket-teeth 23, arranged to operate in laterally-spaced pairs, and the parallel flanges 22 of the small or driven sprocket-wheel 6 are likewise formed with sprocket-teeth 24 at diametrically opposite points arranged to work in laterally-spaced pairs.

The chain above described in passing over the sprocket-wheels is adapted to run in the peripheral channels formed between the peripheral flanges 21 and 22, and the projecting ends of the link-pins 12 and 15 are adapted to engage with the peripheries of said flanges 21 and 22 and to work between or against the sprocket-teeth 23 and 24 in the driving action. In this driving action the chain, or, more properly, the links of the same, do not engage the sprocket-wheels. The entire frictional and driving contacts are between the peripheral flanges and sprocket-teeth and the projecting ends of the link-pins 12 and 15. Furthermore, the pivotal movements of the links of the chain in passing over the sprockets do not cause any slipping friction whatever between the links and the link-pins, as is the case in ordinary constructions; but, on the contrary, the rounded edges of said link-pins will simply rock or roll over the much flatter bearing-surfaces 10 of the seats 9. This feature greatly reduces and practically eliminates all friction and wear on the chain, thereby removing the necessity of oiling, and consequently leaving the chain dry and clean.

As is well known in the ordinary sprocket-and-chain drive, wherein the sprocket-wheels are provided with full sets of teeth, there is considerable frictional engagement to overcome at the points where the sprocket-teeth first engage the chain and again where the chain is disengaged from the sprocket-teeth. By my novel arrangement above described I practically eliminate this friction or loss of power. By reference particularly to Fig. 1, it will be noted that the diametrically-disposed teeth 23 of the driving-sprocket 5 will in one case effect their engagement with the chain and in the other case their disengagement therefrom while the pedals and crank-shaft are in the immediate vicinity of their dead-center. As is well understood, the driving power on the sprocket-wheel 5 is at this time reduced to a minimum, and hence the engagements and disengagements between the chain and the sprocket-teeth are effected at the most opportune time.

Other novel features of the driving-sprocket will now be noted. Inasmuch as the distance between the diametrically-disposed sprocket-teeth 23 of the large driving-sprocket 5 is comparatively great, a slight stretching of the chain will necessitate a corresponding increase in the peripheral distance between said diametrically-disposed teeth. This I accomplish, preferably, by the following details of construction: The sides of the sprocket-wheel 5 are formed with radially-adjustable sections 25, which are provided with lugs 26, which work in suitable seats in the body of the sprocket-wheel 5 and are adjustably secured thereto by means of slots 27 and nutted bolts 28. At their intermediate portions the adjustable sections 25 are each subject to the action of a right and left screw 29, which has screw-threaded engagement with the same and with the body of the sprocket-wheel 5. 30 indicates jam-nuts on the ends of the screws 29 for locking the same wherever set. By this means it will be understood the driving-sprocket may be adjusted to compensate for stretching or lengthening of the sprocket-chain.

From the foregoing it is thought to be obvious that I have provided an extremely efficient sprocket-and-chain drive and have accomplished the objects set forth by me in the premises of this specification.

It will be understood, of course, that the details of construction above specifically set forth may be changed without departing from the spirit of my invention.

What I claim, and desire to secure by Letters Patent of the United States, is as follows:

1. A sprocket-chain, comprising the series of pronged links 1 with seats 8 and 9, and the link-pins 12 formed with lock-notches 13 adapted to embrace the webs surrounding said seats 8, and provided with the projections 14 adapted to be upset to fill said seats 8, substantially as described.

2. A sprocket-chain consisting of a series of links, the end members of which are provided with pin-seats, a removable pin having one or more notches which engage with one of said links, and a spring-yoke engageable with said pin and one of said links to hold said pin with its notches in engagement with said link, substantially as described.

3. A sprocket-chain involving a series of links, the end members of which are provided with pin-seats and one of which end members is provided with seats 18, the removable link-pin 15 with notches 16, and grooves 17, and the spring coupling-yoke 19 with detents 20, said parts operating substantially as described.

4. The combination with a sprocket-chain, of a crank-shaft, provided with pedal-arms and pedals, and a sprocket-wheel on said pedal crank-shaft, provided with sprocket-teeth located at diametrically opposite points, approximately in line with the arms of said crank-shaft, and with the intermediate portions of said sprocket left toothless, substantially as described.

5. The sprocket-wheel 5 with parallel peripheral flanges 21 and teeth 23, the radially-adjustable peripheral sections 25, with lugs 26 connected to the body of the sprocket by slots 27 and nutted bolts 28, and the right and left screw 29 working in said peripheral sections and the body of the sprocket, substantially as described.

6. In a sprocket-chain, the combination with pins having lock-notches, of links with pin-seats, the seats of one of the connected links being elongated to permit lateral movement of the pin to engage its lock-notches with the webs surrounding said elongated pin-seats, and projections on said pins adapted to be upset within said elongated seats to secure said pins against lateral movement therein, substantially as described.

ANTHONY W. MENK.

Witnesses:
CURTIS H. GILKERSON,
SCHUYLER SHORE.